US009569602B2

(12) United States Patent
Violleau et al.

(10) Patent No.: US 9,569,602 B2
(45) Date of Patent: Feb. 14, 2017

(54) MECHANISM FOR ENFORCING USER-SPECIFIC AND DEVICE-SPECIFIC SECURITY CONSTRAINTS IN AN ISOLATED EXECUTION ENVIRONMENT ON A DEVICE

(71) Applicant: Oracle International Corporation, Redwood Shores, CA (US)

(72) Inventors: Thierry Violleau, Yvelines (FR); Patrick Van Haver, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/615,274

(22) Filed: Feb. 5, 2015

(65) Prior Publication Data
US 2016/0232335 A1   Aug. 11, 2016

(51) Int. Cl.
*H04L 29/06*  (2006.01)
*G06F 21/30*  (2013.01)
*G06F 21/31*  (2013.01)
*G06F 21/62*  (2013.01)

(52) U.S. Cl.
CPC .............. *G06F 21/30* (2013.01); *G06F 21/31* (2013.01); *G06F 21/629* (2013.01); *G06F 2221/2105* (2013.01)

(58) Field of Classification Search
CPC ........... G06F 21/00; G06Q 20/34; H04L 63/00
See application file for complete search history.

(56) References Cited

U.S. PATENT DOCUMENTS

| 4,599,489 A | 7/1986 | Cargile |
| 4,609,777 A | 9/1986 | Cargile |
| 4,819,267 A | 4/1989 | Cargile et al. |
| 8,176,533 B1 | 5/2012 | Violleau et al. |
| 8,307,210 B1 | 11/2012 | Duane |
| 8,490,168 B1 | 7/2013 | Holloway et al. |

(Continued)

FOREIGN PATENT DOCUMENTS

WO   2012055792 A1   5/2012

OTHER PUBLICATIONS

International Search Report and Written Opinion issued in PCT/US2014/059766 mailed Dec. 23, 2014, 9 pages.

(Continued)

*Primary Examiner* — Joseph P Hirl
*Assistant Examiner* — Leynna Truvan
(74) *Attorney, Agent, or Firm* — Osha Liang LLP

(57) ABSTRACT

A method and system for receiving from an authenticated user, at an authorization server, via a service provider, an authorization request to perform a sensitive operation on a first device. The method also includes generating, by the authorization server and in response to receiving the authorization request, an authorization token that includes a device constraint and a binding code constraint, which includes a binding code. Additionally, the method includes transmitting the authorization token to an isolated execution environment of the first device, where the sensitive operation is not permitted on the first device unless the first device successfully performs a verification in the isolated execution environment using the authorization token. Furthermore, the method includes permitting the sensitive operation based on the verification.

29 Claims, 8 Drawing Sheets

(56) References Cited

U.S. PATENT DOCUMENTS

| | | |
|---|---|---|
| 2007/0150942 A1 | 6/2007 | Cartmell |
| 2008/0127321 A1 | 5/2008 | Vaeth |
| 2009/0198618 A1 | 8/2009 | Chan et al. |
| 2009/0258631 A1 | 10/2009 | Forsberg et al. |
| 2012/0031969 A1 | 2/2012 | Hammad |
| 2012/0110646 A1 | 5/2012 | Ajitomi et al. |
| 2015/0072726 A1* | 3/2015 | Stern .................. H04W 88/06 455/552.1 |

OTHER PUBLICATIONS

Menezes, A. et al, "Handbook of Applied Cryptography, Chapter 12: Key Establishment Protocols", [CRC Press Series on Discrete Mathematices and Its Applications], CRC Press, Boca Raton, FL, US, pp. 489-541. 52 pages.

Meta data about auth token's User. (2013). Retrieved Sep. 30, 2013, from <http://developer.wordpress.com/docs/api/1/get/me/>, 3 pages.

Authenticating to OAuth2 Services. (2013). Retrieved Sep. 30, 2013, from <http://developer.android.com/training/id-auth/authenticate.html>, 5 pages.

Youn-Kyoung Park, et al., "User Authentication Mechanism Using Java Card for Personalized IPTV Services", International Conference on Convergence and Hybrid Information Technology 2008, pp. 618-626. 8 pages.

FortiToken Mobile-Software (OTP) for Mobile Devices. (2013). Retrieved Sep. 30, 2013, from <http://www.fortinet.com/products/fortitoken/mobile.html>, 2 pages.

Fortinet Technologies Inc., FortiToken Two Factor Authentication Solutions Guide, Nov. 16, 2012, 13 pages.

Authentication, mapping, and authorization with TFIM V6.2 and T A M. (2013). Retrieved Sep. 30, 2013 from, <http://publib.boulder.ibm.com/infocenter/wmbhelp/v7r0m0/index.jsp?topic=%2Fcom.ibm.etools.mft.doc%2Fbp8100__.html>, 5 pages.

Apple Inc., "Local and Push Notification Programming Guide", last modified Sep. 18, 2013. <http://developer.apple.com/library/ios/documentation/NetworkingInternet/Conceptual/RemoteNotificationsPG/RemoteNotificationsPG.pdf>, 59 pages.

Peng Kunyu, et al., "An identity authentication system based on mobile phone token". Retrieved Sep. 30, 2013 from, <http://ieeexplore.ieee.org/xpl/articleDetails.jsp?tp=&arnumber=5360974&queryText%3Dauthorization+token+ mobile>, 1 page.

\* cited by examiner

MECHANISM FOR ENFORCING USER-SPECIFIC AND DEVICE-SPECIFIC SECURITY CONSTRAINTS IN AN ISOLATED EXECUTION ENVIRONMENT ON A DEVICE

CROSS-REFERENCE TO RELATED APPLICATIONS

The present application contains subject matter that may be related to the subject matter in the following U.S. Patent Applications, which are assigned to a common assignee and are incorporated by reference in their entirety: U.S. patent application Ser. No. 14/220,966 filed on Mar. 20, 2014, entitled "System and Method for Managing Tokens Authorizing On-Device Operations."; and P.C.T. Patent Application Serial No. PCT/RU2014/000600 filed on Aug. 11, 2014, entitled "Method and System for Managing Fine-Grained Policies for Requiring User Approval of Device Management Operations."

BACKGROUND

Users of computing devices often seek to perform various operations on a device. Such operations may be sensitive operations (e.g., operations that include sensitive information, device management operations, application installation operations etc.) which may require at least some measure of authentication and/or authorization before the operation is allowed to proceed on the device.

SUMMARY

In general, in one aspect, embodiments disclosed herein relate to a method that includes receiving from an authenticated user, at an authorization server, via a service provider, an authorization request to perform a sensitive operation on a first device. The method also includes generating, by the authorization server and in response to receiving the authorization request, an authorization token that includes a device constraint and a binding code constraint, which includes a binding code. Additionally, the method includes transmitting the authorization token to an isolated execution environment of the first device, where the sensitive operation is not permitted on the first device unless the first device successfully performs a verification in the isolated execution environment using the authorization token. Furthermore, the method includes permitting the sensitive operation based on the verification.

In general, in one aspect, embodiments disclosed herein relate to a system that includes an authorization server that includes a first processor and first memory and is configured to receive from an authenticated user, via a service provider, an authorization request to perform a sensitive operation on a first device. The authorization server is also configured to generate, in response to receiving the authorization request, an authorization token that includes a device constraint and a binding code constraint, which includes a binding code. Additionally, the authorization server is configured to transmit the authorization token to an isolated execution environment of the first device, where the sensitive operation is not authorized on the first device unless the first device successfully performs a verification in the isolated execution environment using the authorization token, and where the verification includes a first verification and a second verification. The system also includes the first device, which includes a second processor, second memory and the isolated execution environment, and is configured to perform, in the isolated execution environment, the first verification using the device constraint of the authorization token to determine that the device constraint matches an expected value. The first device is also configured to perform, in the isolated execution environment, the second verification using the binding code constraint of the authorization token to determine that the binding code of the binding code constraint matches a received binding code provided on the first device by the authenticated user, where successful performance of the first verification and the second verification authorizes performance of the sensitive operation. Additionally, the first device is configured to perform the sensitive operation on the first device based on the verification.

In general, in one aspect, embodiments disclosed herein relate to a non-transitory computer readable medium that includes instructions that, when executed by a computer processor, perform a method that includes receiving from an authenticated user, at an authorization server, via a service provider, an authorization request to perform a sensitive operation on a first device. The method also includes generating, by the authorization server and in response to receiving the authorization request, an authorization token comprising a device constraint and a binding code constraint comprising a binding code. Additionally, the method includes transmitting the authorization token to an isolated execution environment of the first device, wherein the sensitive operation is not permitted on the first device unless the first device successfully performs a verification in the isolated execution environment using the authorization token. Furthermore, the method includes permitting the sensitive operation based on the verification.

Other aspects of embodiments disclosed herein will be apparent from the following description and the appended claims.

DETAILED DESCRIPTION

Figure 1:
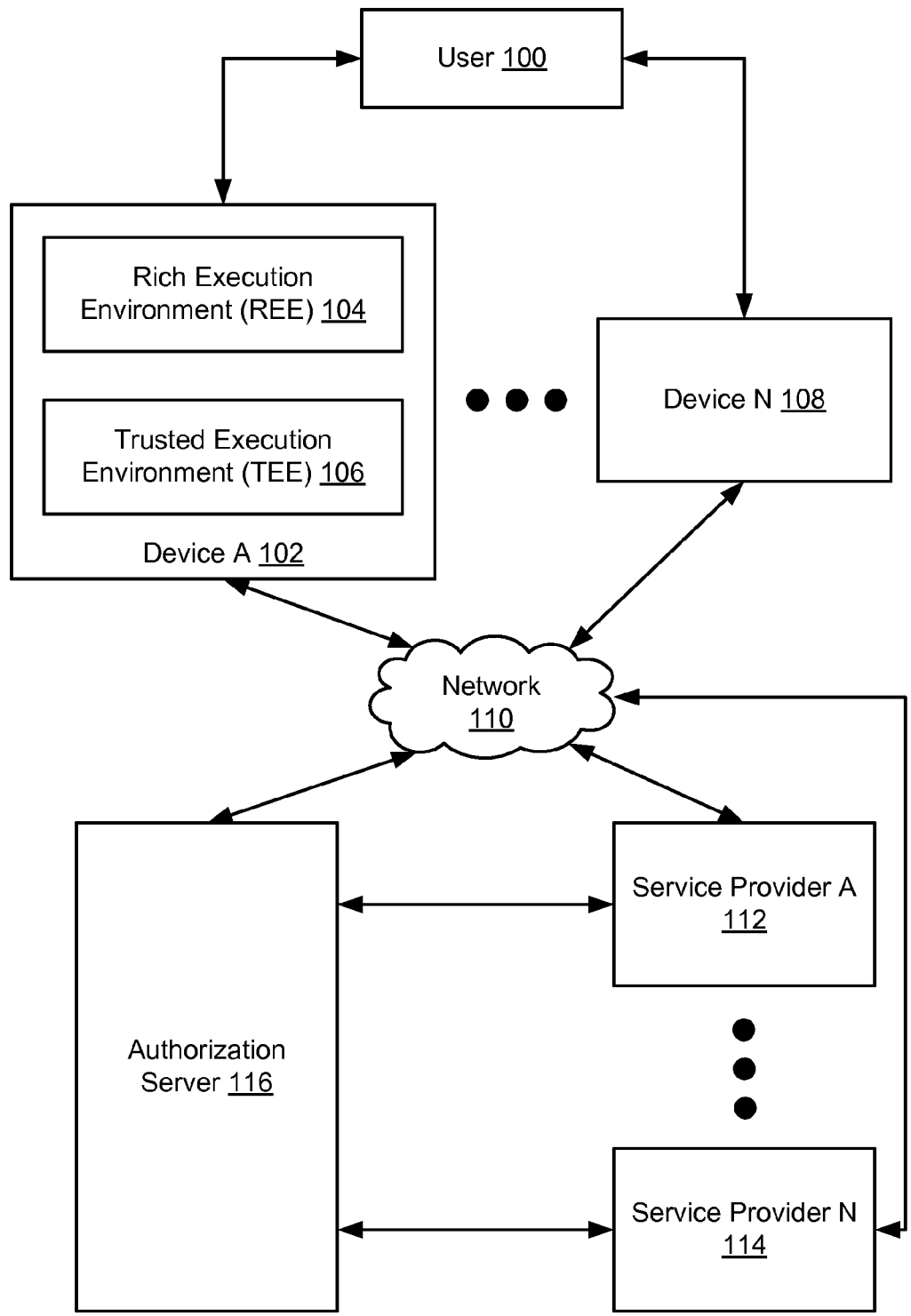
FIG. 1 shows a schematic diagram in accordance with one or more embodiments disclosed herein.

Specific embodiments disclosed herein will now be described in detail with reference to the accompanying figures. Like elements in the various figures may be denoted by like reference numerals and/or names for consistency.

In the following detailed description of disclosed embodiments, numerous specific details are set forth in order to provide a more thorough understanding. However, it will be apparent to one of ordinary skill in the art that embodiments disclosed herein may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments disclosed herein provide a method and system for, when a user seeks to perform a sensitive operation on a device, verifying that the user has the authority to perform the sensitive operation on the device. Specifically, in one or more embodiments disclosed herein, a binding code is transmitted (e.g., by a service provider) to an authenticated user that is requesting performance of a sensitive operation on a device. The device may be associated with one or more device constraints (e.g., a device identifier specific to the device). The performance sensitive operation may be restricted to a unique device and/or set of devices, at least in part, by the use of the one or more device constraints. In one or more embodiments disclosed herein, before the sensitive operation may be performed, the authenticated user may be requested to provide the binding code on the device for which the sensitive operation is requested. In one or more embodiments disclosed herein, the binding code and one or more device constraints must be successfully verified before the sensitive operation proceeds. In one or more embodiments disclosed herein, the binding code and one or more device constraints may be transmitted from an authorization server to the device via an authorization token.

FIG. 1 shows a system in accordance with one or more embodiments disclosed herein. The system may include a user (100) and one or more devices (e.g., device A (102), device N (108)). A device may include a rich execution environment (REE) (104) and a trusted execution environment (TEE) (106). In one or more embodiments disclosed herein, the system includes an authorization server (116) and one or more service providers (e.g., service provider A (112), service provider N (114)). In one or more embodiments disclosed herein, one or more of the aforementioned components are operatively connected via a network (110). Each of these components is described below.

In one or more embodiments disclosed herein, a device (e.g., device A (102), device N (108)) is a computing device. In one or more embodiments disclosed herein, a computing device is any device and/or any set of devices capable of electronically processing instructions and that includes at least the minimum processing power (e.g., via one or more processors and/or processing cores), memory (e.g., random access memory (RAM)), input and output device(s), and/or network connectivity, in order to perform, at least in part, the functionality described in accordance with one or more embodiments disclosed herein. Examples of computing devices include, but are not limited to, servers (e.g., rack servers, blade-servers in a blade-server chassis, etc.), desktop computers, mobile devices (e.g., laptop computers, smart phones, personal digital assistants, e-readers, tablet computers, and/or any other mobile devices), gaming devices, and/or any other type of computing device with the aforementioned minimum requirements.

In one or more embodiments disclosed herein, the TEE (106) of a device (e.g., device A (102), device N (108)) is a secure area in a device which ensures that sensitive data is stored, processed, and/or protected in a trusted environment. For example, a TEE (106) may include TEE software and appropriate device hardware, such as at least a portion of one or more device processors. Specifically, TEE software may be installed by a device manufacturer such that the TEE software automatically executes using hardware of the device (e.g., device A (102), device N (108)) for certain applications which require use of sensitive data. Content providers (e.g., service providers) of secure applications using sensitive data must comply with the TEE platform and structural requirements.

In one or more embodiments disclosed herein, the TEE (106) and/or trusted applications executing therein are configured to manage sensitive information on behalf of a user (100) of device (e.g., device A (102), device N (108)) and/or a service provider (e.g., service provider A (112), service provider N (114)). To this end, embodiments disclosed herein may ensure that a trusted application is managed within an appropriate TEE executing as part of a device that is bound to an authenticated user. Said another way, a trusted application may only be allowed to perform sensitive operations within the TEE of a device to which an authenticated user has been bound as described in accordance with embodiments disclosed herein. The TEE architecture may enable a level of security sufficient for a significant number of applications, or portions thereof, through which a user and/or a service provider may perform a sensitive operation. In one or more embodiments disclosed herein, the TEE (106) is configured to perform sensitive operations subject to security protection on a device, such as, for example, banking operations, payment operations, installation operations, premium content (e.g., premium audio and/or video content) access operations, etc.

A TEE architecture is defined in a document entitled "GlobalPlatform Device Technology TEE System Architecture" version 1.0 dated December 2011. One type of communication between applications running within a rich execution environment and the applications residing in a TEE is defined in the document entitled "GlobalPlatform Device Technology TEE Client API Specification" version 1.0 dated July 2010. The TEE system architecture and the TEE Client API Specification are incorporated by reference in their respective entireties. Embodiments disclosed herein are not limited to a particular version of a TEE system architecture or a particular version of a TEE client API specification. The TEE is discussed further in the description of FIG. 2, below.

In one or more embodiments disclosed herein, a REE (104) of a device (e.g., device A (102), device N (108)) is an execution environment that is provided for and governed by a rich operating system (OS) (not shown), which executes outside of the TEE (106). In one or more embodiments disclosed herein, the REE (104) includes functionality to provide device resources (e.g., device hardware) to a rich OS (not shown), which may be a robust OS, developed with functionality and performance as key goals rather than security. For example, the rich OS may include functionality required for the execution of one or more software applications (e.g., multimedia content streaming application, games, etc.) at least partly within the REE (104). In one or more embodiments disclosed herein, the rich OS may run with lower security boundaries than a trusted OS and/or trusted application executing within the TEE (106). From the perspective of the TEE (106), the REE (104), the rich OS executing in the REE, and any applications executing in the rich OS are considered un-trusted. In one or more embodiments disclosed herein, some applications include a portion that executes in a REE (i.e., an untrusted portion) and a portion that executes in a TEE (i.e., a trusted portion). The REE is discussed further in the description of FIG. 2, below.

In one or more embodiments disclosed herein, an execution environment of a device (e.g., device A (102), device N (108)) in which a device operating system executes may be partitioned into a REE (104) and a TEE (106). In such embodiments, the TEE (106) is an isolated execution environment with its own set of hardware and software components that runs in parallel with but separate from the REE (104), and includes functionality to provide security services for the REE. In one or more embodiments disclosed herein, the TEE (e.g., the isolated execution environment) and the REE are separated by logical and/or physical barriers. For example, a mobile device (e.g., smart phone) may include an isolated execution environment that executes using a first processor, first storage device, and first stored instructions of the mobile device, and also include a rich OS executing in a REE using a second processor, second storage device, and second stored instructions of the mobile device, thereby actuating a physical separation of the isolated execution environment and the REE. In such an example, the mobile device may include separate chips, one for the isolated execution environment and one for the REE. As another example, a mobile device (e.g., smart phone) may include an isolated execution environment that executes in a first virtual machine executing on the mobile device, and also include a rich OS executing in a REE using a second virtual machine of the mobile device, thereby actuating a logical separation of the isolated execution environment and the REE. In one or more embodiments disclosed herein, any logical separation, any physical separation, and/or any combination thereof may be used to separate the isolated execution environment from the REE. In one or more embodiments disclosed herein, the logical and/or physical barrier between the isolated execution environment and the TEE may not be circumvented by instructions stored in and/or accessible to the rich OS and/or the REE.

Returning to the description of FIG. 1, in one or more embodiments disclosed herein, a user (100) is operatively connected, at least part of the time, to one or more devices (e.g., device A (102), device N (108)). In one or more embodiments disclosed herein, a user is any entity capable of interacting with a device. For example, a user may be a human. As another example, the user may be a computing device that is separate from and operatively connected to a device (e.g., device A (102), device N (108)). In one or more embodiments disclosed herein, a user is operatively connected to a device via being physically proximate to the device and therefore able to physically interact with the device (e.g., via a touchscreen, keyboard, mouse, etc.). As another example, the user may be operatively connected to and able to access the device remotely (e.g., via a network (110)).

The device (e.g., device A (102), device N (108)) may be owned by the user, or, in one or more embodiments disclosed herein, may be owned by a company, university, government agency and/or other entity that permits the use of the device by the user (100). In one or more embodiments disclosed herein, the user (100) includes functionality to receive requests to authenticate the user via a device, respond to authentication requests via a device, receive binding codes (not shown) via a device, and provide binding codes on a device (e.g., device A (102), device N (108)).

In one or more embodiments disclosed herein, a binding code (not shown) is any information that may be transmitted to an authenticated user that may be used to identify the authenticated user. In one or more embodiments disclosed herein, the authenticated user is identified by the binding code in a context restricted to the performance of a sensitive operation. For example, a binding code may be a character string of any length. As another example, the binding code may be a file (i.e., a computer file) that includes certain characteristics which may be verified, such as an audio file, an image file, biometric data file, and/or any other type of file. As used herein, the term binding code may refer to an unencrypted boding code, an encrypted binding code, a digest of the binding code, a signature of the binding code, and/or a cryptographic calculation. In one or more embodiments disclosed herein, a user (100) may be operatively connected, concurrently and/or at separate times, to more than one device (e.g., device A (102), device N (104)). In such embodiments, one or more of the devices (e.g., device A (104)) to which the user is connected may include a TEE (106), while other devices (e.g., device N (108)) to which the user is connected may not include a TEE. A binding code may be received by an authenticated user at a device that includes a TEE (106) and/or a device that does not include a TEE. In one or more embodiments disclosed herein, verification of a binding code occurs on a device (e.g., device A (104)) that includes a TEE (106) and is the device on which an authenticated user seeks performance of a sensitive operation.

In one or more embodiments disclosed herein, a device (e.g., device A (102), device N (108)) is operatively connected to one or more service providers (e.g., service provider A (112), service provider N (114)) and/or one or more authorization servers (e.g., authorization server (116)). For example, in embodiments such as that shown in FIG. 1, devices are connected to service providers and an authorization server via a network (110). In one or more embodiments disclosed herein, a network (110) is a collection of one or more network devices (not shown) that facilitates network connectivity for one or more operatively connected computing devices (e.g., device A (102), authorization server (116), service provider A (112)). In one or more embodiments disclosed herein, the network (110) may be all or a portion of a computer network. A computer network may include a datacenter network, a wide area network, a local area network, a wireless network, a cellular phone network, or any other suitable network that facilitates the exchange of information from one part of the network to another. The network (110) may be coupled with or overlap with the Internet.

In one or more embodiments disclosed herein, a service provider (e.g., service provider A (112), service provider N (114)) is any entity that provides services, content, and/or any other form of information to a device (e.g., device A (102), device N (108)) and/or a user (100) of the device. In one or more embodiments disclosed herein, a service provider (e.g., service provider A (112), service provider N (114)) includes one or more computing devices (not shown), of which at least a portion include network connectivity in order to interact with, at least, one or more devices (e.g., device A (102), device N (108)) and which are used for implementing at least a portion of the functionality of a service provider.

A service provider (e.g., service provider A (112), service provider N (114)) may include functionality to receive requests (e.g., from a user via a device) from a user (100) to perform a sensitive operation on a device (e.g., device A (102), device N (108)), to authenticate a user making such a request, to request binding codes, to send binding codes to a user via a device, and/or to request that an authorization server generate an authorization token and transmit the authorization token to a device. For example, a service provider (e.g., service provider A (112), service provider N (114)) may be an application and content provider which provides applications for devices through which users may receive premium multimedia content (e.g., movies, television programs, etc.) upon request. As another example, the service provider may be a financial institution that provides an application for devices to users seeking to manipulate one or more aspects of the user's finances. Such applications may require installation and/or execution, at least in part, within a TEE (106) of a device (e.g., device A (102)) in order to perform sensitive operations.

In one or more embodiments disclosed herein, one or more service providers (e.g., service provider A (112), service provider N (114)) and/or one or more devices (e.g., device A (102), device N (108)) are operatively connected (e.g., via a network (110)) to an authorization server (116). In one or more embodiments disclosed herein, a server is software, firmware, hardware (e.g., circuitry, one or more computing devices, etc.), and/or any combination thereof capable of receiving requests (e.g., from a client such as a device) and/or responding to requests. For example, a server may be software executing on one or more computing devices (e.g., one or more rack servers in a server rack located in a datacenter) which are operatively connected to, at least, one or more clients (e.g., device A (102), device N (108)). In one or more embodiments disclosed herein, an authorization server is operated by an authorization entity (not shown). An authorization entity is any entity capable of providing authorization services related to devices and/or users via, at least in part, an authorization server (116).

More specifically, the authorization server (116) includes functionality to receive authorization requests (e.g., from a service provider), generate an authorization token (not shown), and/or transmit an authorization token to a device (e.g., device A (102), device N (108)). In one or more embodiments disclosed herein, an authorization token includes one or more device constraints and a binding code constraint that includes a binding code, or an encrypted version of the binding code, which was previously provided to an authenticated user of a device. In one or more embodiments disclosed herein, the binding code constraint of the authorization token may also include a digital signature, a digest, any cryptographic operation, a retry counter, and/or an expiration date. The authorization server optionally also includes functionality to transmit a binding code to an authenticated user via a service provider in response to receiving an authorization request.

In one or more embodiments disclosed herein, the authorization server includes functionality to transmit an authorization token to a TEE (106) of a device. For example, a trusted application executing in a TEE (106) of a device (e.g., device A (102), device N (108)) may include functionality to receive authorization tokens from an authorization server (116). In one or more embodiments disclosed herein, the authorization token may be transmitted, at least in part, using various security measures available to the authorization server (e.g., encryption technology) and/or via an input/output peripheral device such as, for example, a network interface card. In one or more embodiments disclosed herein, an authorization token permits a user of a device the ability to perform a previously requested sensitive operation on a device (e.g., device A (102), device N (108)). Authorization tokens are discussed further in the description of FIG. 3, below.

In one or more embodiments disclosed herein, in addition to being connected to one or more service providers via the network, an authorization server (116) may be connected to one or more service providers (e.g., service provider A (112), service provider N (114)) via a trusted relationship with the service provider. Through the trusted relationship, a service provider may be pre-authenticated with the authorization server such that the authorization server trusts that any services, content, information, etc. provided to a device, and/or an sensitive operations requested by a user via a service provider, is secure content and/or a secure operation. In one or more embodiments disclosed herein, a service provider (e.g., service provider A (112), service provider N (114)) may pay the authorization entity operating the authorization server in order to have the ability to install a trusted application within the TEE of the device of a user who subscribes to the service provider for service(s) and/or content.

While FIG. 1 shows a configuration of components, other configurations may be used without departing from the scope of the embodiments disclosed herein. For example, various components may be combined to create a single component. As another example, the functionality performed by a single component may be performed by two or more components. In one or more embodiments disclosed herein, one or more of the modules and elements shown in FIG. 1 may be omitted, repeated, and/or substituted. Additionally, while FIG. 1 shows a device that includes a TEE, one of ordinary skill in the art and having the benefit of this disclosure will recognize that embodiments disclosed herein may include devices that include any type of isolated execution environment. Accordingly, embodiments disclosed herein should not be considered limited to the specific arrangements of modules and elements shown in FIG. 1.

Figure 2:
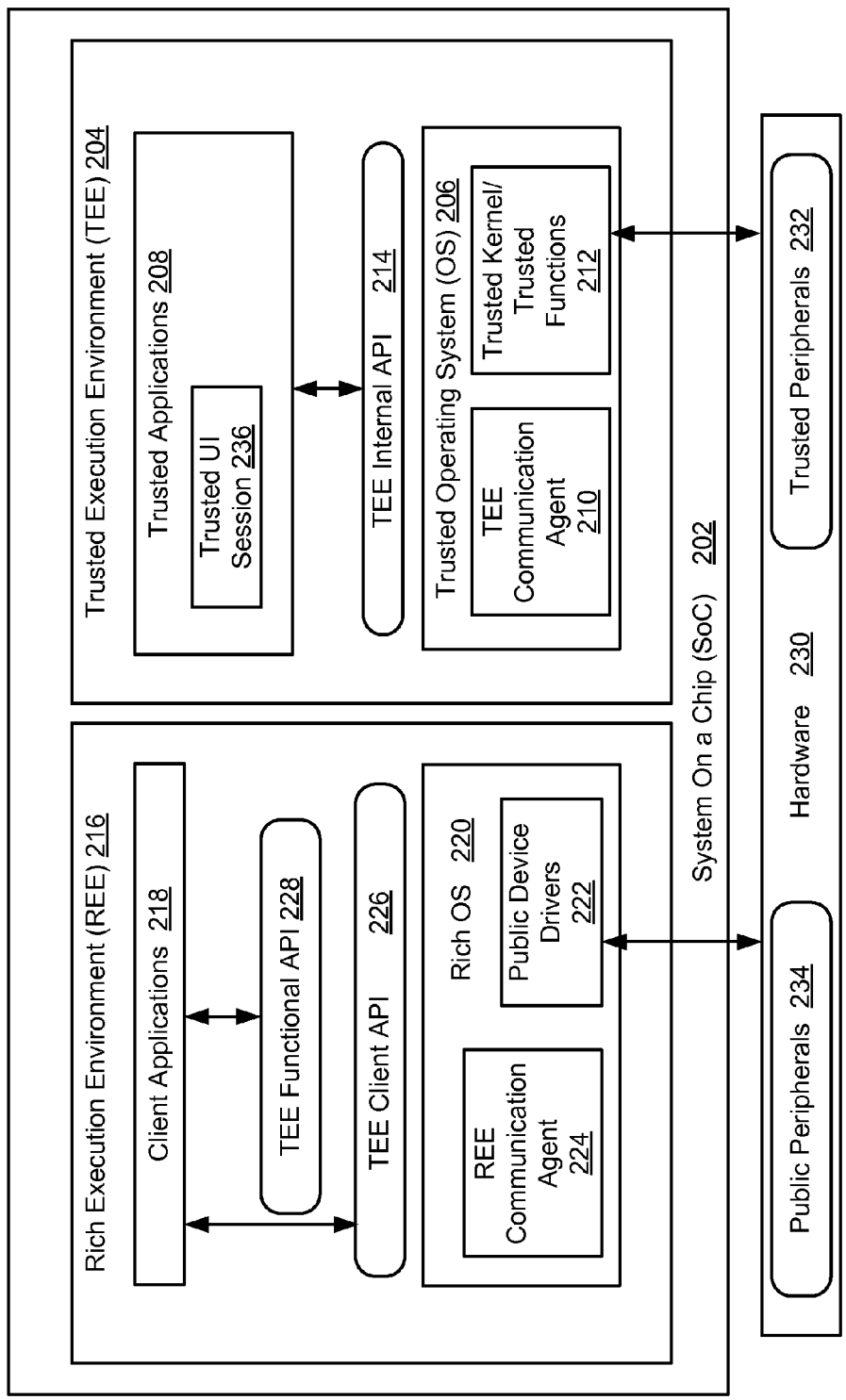
FIG. 2 shows an exemplary device architecture in accordance with one or more embodiments disclosed herein.

FIG. 2 shows an example system architecture that may be implemented on a device in accordance with one or more embodiments disclosed herein. Specifically, FIG. 2 shows a system-on-a-chip (SoC) (202) hosting a REE (216) and a TEE (204) executing on a device. Both the REE (216) and the TEE (204) interface with the hardware (230) of the device. Each of the aforementioned components are described in detail below.

In one or more embodiments disclosed herein, the SoC (202) is an electronic subsystem on the device, all of whose components are included in a single integrated circuit. In one or more embodiments, both the REE (216) and the TEE (204) are part of the SoC in a typical chipset architecture. The TEE (204) may be made up of a separate on-chip security subsystem within the SoC, or may operate as a portion of each of the SoC components (e.g., the random access memory, read only memory, cryptographic accelerators, processing core(s), peripheral devices, etc.). In one or more embodiments disclosed herein, a primary purpose of the TEE is to protect its assets from the REE (216) through hardware mechanisms which are beyond the REE's control. For example, the TEE provides trusted storage of data and keys, where the storage of data is bound to the device so that no unauthorized internal and/or external entity (e.g., an attacker) may access, copy, or modify the data contained within the TEE.

Each of the REE (216) and the TEE (204) may include similar components that are specific to the environment in which the components execute. For example, the REE (216) may include client applications (218) which are typically not secure applications requiring use of sensitive data, and correspondingly, the TEE (204) may include TEE applications also named trusted applications (208) which provide security related functionality to client applications (218) outside of the TEE (i.e., in the REE). A client application may be any application that executes in the REE, and a trusted application may be any application that executes in the TEE and/or via a trusted OS (206) executing within the TEE. A client application may use one or more trusted applications. For example, PayPal® is a client application, which may use a trusted application to manage its credentials (the "PayPal credential management" trusted application). In one or more embodiments disclosed herein, when secure applications are obtained by the user of the device (e.g., from a service provider), the secure applications are installed in two parts; first, the client application portion is installed onto the device, and subsequently the trusted application portion of the application is installed on the device (i.e., within the TEE).

In one or more embodiments disclosed herein, a trusted OS (206), which is designed to enable the TEE (204) using security based design techniques, executes within the TEE. In one or more embodiments disclosed herein, trusted applications (208) may execute within the trusted OS and/or the TEE (204). In one or more embodiments disclosed herein, a trusted application is any software application, or portion thereof, that includes functionality to execute within a TEE of a device. For example, a trusted application may be used to perform sensitive operations on a device (e.g., device A (102) of FIG. 1).

Continuing with FIG. 2, the TEE functional API (228) in the REE (216) may be a REE software interface dedicated to exposing an inbuilt TEE capability, such as cryptography, for the client application (218) developer and/or provider (e.g., a service provider). On the TEE (204) side, the TEE exposes sets of application programming interfaces (APIs) to enable communication from the REE and others to use trusted software functionality within the TEE. More specifically, a trusted OS may be hosting code that provides an internal API to trusted applications which run on top of the trusted OS, and provides a proprietary method to enable the client device API software to interface with the TEE from other execution environments. The TEE internal API (214) is one of these APIs exposed by the trusted OS (206) to trusted applications (208), allowing them to exploit the features defined in the trusted OS (206) and to communicate with the rich OS (220).

On the REE (216) side, the TEE client API (226) is a communication interface designed to enable a client application running in the rich OS (220) to access and exchange data with a trusted application (208) in the TEE (204). The rich OS (220) is an OS providing a wider variety of features than that of the trusted OS (206) in the TEE (204). As discussed above in the description of FIG. 1, the rich OS is built with functionality and performance as key goals, and has an open ability to perform operations. In one or more embodiments disclosed herein, the rich OS (220) includes a REE communication agent (224) and one or more public device drivers (222). The REE communication agent (224) may be a rich OS (220) driver that enables communication between the REE (216) and the TEE (204). Public device drivers (222) are drivers which allow communication with public peripherals (234) in the device hardware (230). Public peripherals (234) may include input/output devices. As the REE cannot directly call to TEE functions, the REE software goes through protocols such that the trusted OS and/or trusted application performs the verification of the acceptability of any operation that the REE software requests.

In contrast, the trusted OS (206) is limited in that it is built to enable the TEE using security based design techniques. In one or more embodiments disclosed herein, the trusted OS (206) provides the TEE internal API to trusted applications (208) and a proprietary method to enable the TEE client API software interface from other execution environments. The trusted OS (206) may include a TEE communication agent (210) and/or a trusted kernel/trusted functions (212). In one or more embodiments disclosed herein, the TEE communication agent (210) is a trusted OS (206) driver that enables communication between the REE (216) and TEE (204). The trusted kernel/trusted functions (212) may be trusted OS (206) components dedicated to exposing an inbuilt TEE capability, such as cryptography.

The trusted kernel/trusted functions (212) may also allow for communication with trusted peripherals (232) in the device hardware (230). Trusted peripherals (232) may include input/output devices associated with a trusted user interface (UI) session (236). In one or more embodiments, a trusted UI session may be initiated by the REE (216) and is a secure UI that may be used to bind a user to the device, and by extension, the TEE (204) of the device. A user-binding trusted application may be dedicated to a given service provider and/or to a group of service providers. Further, although not shown in FIG. 2, the TEE may be configured to provide trusted storage of data, keys, authorization tokens, etc. such that no unauthorized internal and/or external entity may access, copy, or modify the data contained in trusted storage. For example, the device on which a TEE is configured may include one or more types of available storage, of which a portion may be provided solely to the TEE for storing sensitive information.

In one or more embodiments disclosed herein, a trusted UI (236) is a graphical user interface presented to the user on the client device that is specifically associated with the TEE (204) of the device or even the user of the device. The trusted UI (236) session may be part of a global TEE platform. In one or more embodiments, the trusted UI session is a unique user interface that is noticeably distinct from the normal UI which is typically presented to the user for non-TEE related operations (e.g., as a part of a client application (218)). Said another way, the trusted UI (236) session is specific to a device and may be customized by the user to present a security indicator of some type when the trusted UI (236) session is operating.

The term UI as used herein may include the keyboard, the touchscreen, the biometric sensor, the screen/frame buffer, and more generally, any sensor or peripheral of the client device implying user input and/or output. For example, during a trusted UI (236) session, a dedicated light (LED) on the device may be enabled when such a session is initiated. Alternatively, any other suitable UI feature may be presented to indicate the execution of a trusted UI (236) session that only the user knows, such as a word or phrase and/or a picture that the user provided may display on a portion of the UI screen. Accordingly, the user of the device recognizes the manner in which a trusted UI is presented and when a trusted UI session is running on the device.

In one or more embodiments disclosed herein, a trusted UI (236) session is configured to query the user for user credentials and can be customized per and by a given service provider and/or authorizing entity. User credentials may be a username/password, a one-time password (OTP), biometric information such as a fingerprint scan or retina scan, or any other suitable information that may be used to identify and authenticate the user of the device. The trusted UI session is also configured to protect the information provided by the user. The user credentials are not disclosed to the outside REE (216), but rather, stay only within the TEE (204) and are not accessible from other applications in the REE. In addition, the trusted UI (236) session wraps the user credentials cryptographically to protect the sensitive data. In one or more embodiments, the original version of the user credentials are deleted, and the trusted UI (236) session passes only the cryptographically wrapped version for validation and verification to the service provider via the REE (216).

In one or more embodiments disclosed herein, the TEE (204) is configured to obtain a binding code from the user via the trusted UI (236) session and binds the user credentials to a TEE identifier of the TEE (204). In one or more embodiments the TEE identifier is stored in the hardware (230) of the device (302). The TEE identifier uniquely identifies the TEE installed on the device. In one or more embodiments, the TEE identifier may be the same as the device identifier which uniquely identifies the device. The TEE identifier and/or the device identifier may be used as device constraints in an authorization token. While FIG. 2 shows an exemplary system architecture including a configuration of components, other configurations may be used without departing from the scope of the embodiments disclosed herein. For example, various components may be combined to create a single component. As another example, the functionality performed by a single component may be performed by two or more components. In one or more embodiments, one or more of the modules and elements shown in FIG. 2 may be omitted, repeated, and/or substituted. Accordingly, embodiments disclosed herein should not be considered limited to the specific arrangements of modules and elements shown in FIG. 2.

Figure 3:
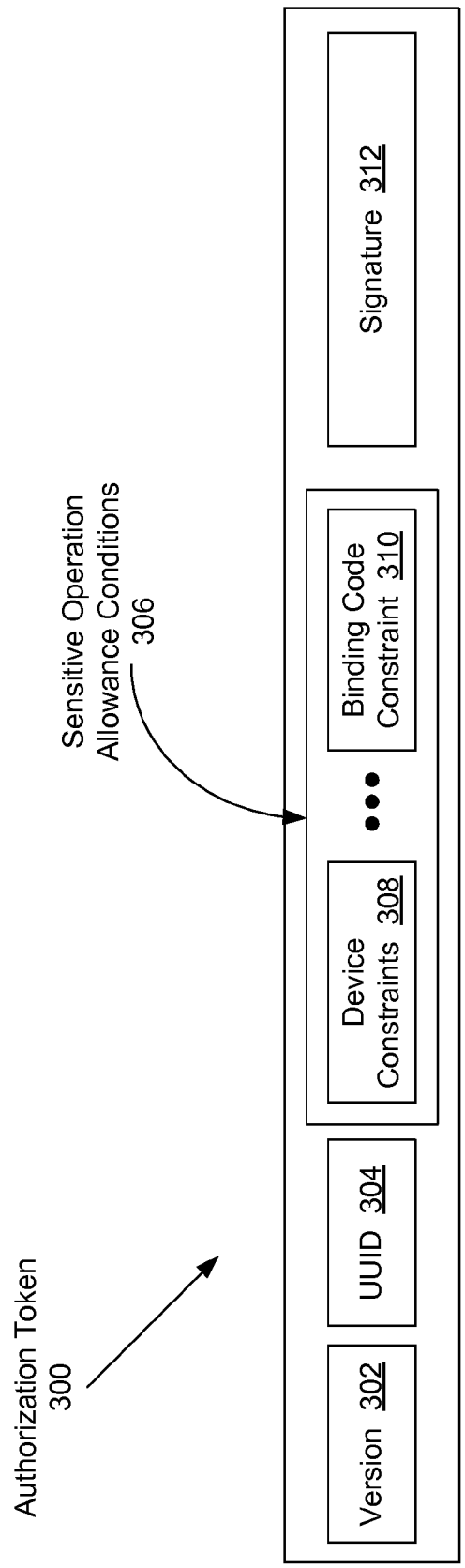
FIG. 3 shows an authorization token in accordance with one or more embodiments disclosed herein.

FIG. 3 shows an exemplary authorization token in accordance with one or more embodiments disclosed herein. As described above, in one or more embodiments disclosed herein, an authorization token (300) is a data structure generated by an authorization server (e.g., authorization server (116) of FIG. 1) in response to receiving a request from a user (e.g., user (100) of FIG. 1), via a service provider (e.g., service provider A (112) of FIG. 1), to perform a sensitive operation on a device (e.g., device A (102) of FIG. 1). In one or more embodiments disclosed herein, the authorization token includes one or more sensitive operation allowance conditions (306). Sensitive operation allowance conditions may include one or more device constraints (308) such as, for example, a device identifier and/or a TEE identifier, as well as a binding code constraint (310) that includes the binding code that was previously provided to a user (e.g., by a service provider).

As shown in FIG. 3, the authorization token may optionally include additional information. For example, the authorization token (300) may include a cryptographic signature (312), which allows the client device to verify the integrity and authenticity of authorization before processing it. The authorization token (300) may also optionally store a version number (302) and a universally unique identifier (UUID) (304) that uniquely identifies a security domain (SD) (not shown) that owns and/or has access to a key able to verify the authorization token (300).

In one or more embodiments disclosed herein, when the device on which a sensitive operation is requested is a TEE-enabled device (i.e., a device that has installed and executes a TEE), the UUID (304) may identify the SD sub-entity within the TEE having the keys to decrypt the cryptographically signed authorization token and verify the authorization token signature (312). Those skilled in the art will appreciate that several SDs may exist in a TEE.

In one or more embodiments disclosed herein, the authorization token (300) includes various sensitive operation allowance conditions (306). The sensitive operation allowance conditions (306) may specify one or more device constraints (308) that restrict the applicability of the authorization token (300) and must be satisfied in order for the requested operation to be performed. For example, the device constraints (308) may include a device identifier (not shown) that is associated with the particular device to which the authorization token (300) is transmitted. In one or more embodiments disclosed herein, the sensitive operation allowance conditions (306) also include a binding code constraint (310) which includes a binding code that was previously provided to a user requesting to perform a sensitive operation.

As mentioned above, the authorization token (300) may also be associated with a cryptographic key in the form of a digital signature (312) used to secure the authorization token. The digital signature may be generated using a private key known only to the entity and/or authority authorized to make the signature. The digital signature (312) may be verified on the receiving end by software executing on a device (e.g., a trusted application).

Embodiments are not limited to the exemplary authorization token configuration shown in FIG. 3.

Figure 4:
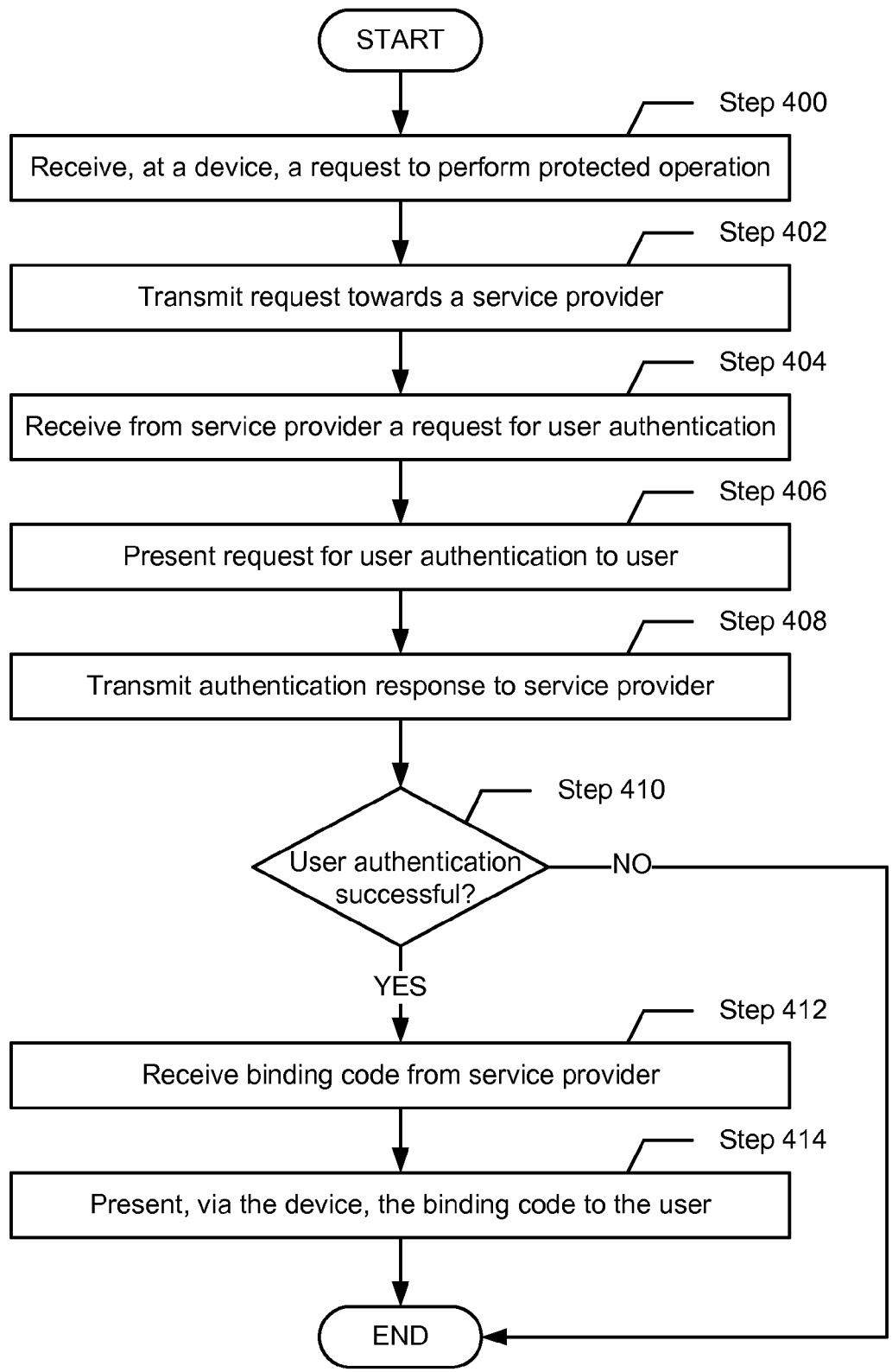
FIGS. 4-6 show flowcharts in accordance with one or more embodiments disclosed herein.
Figure 5:
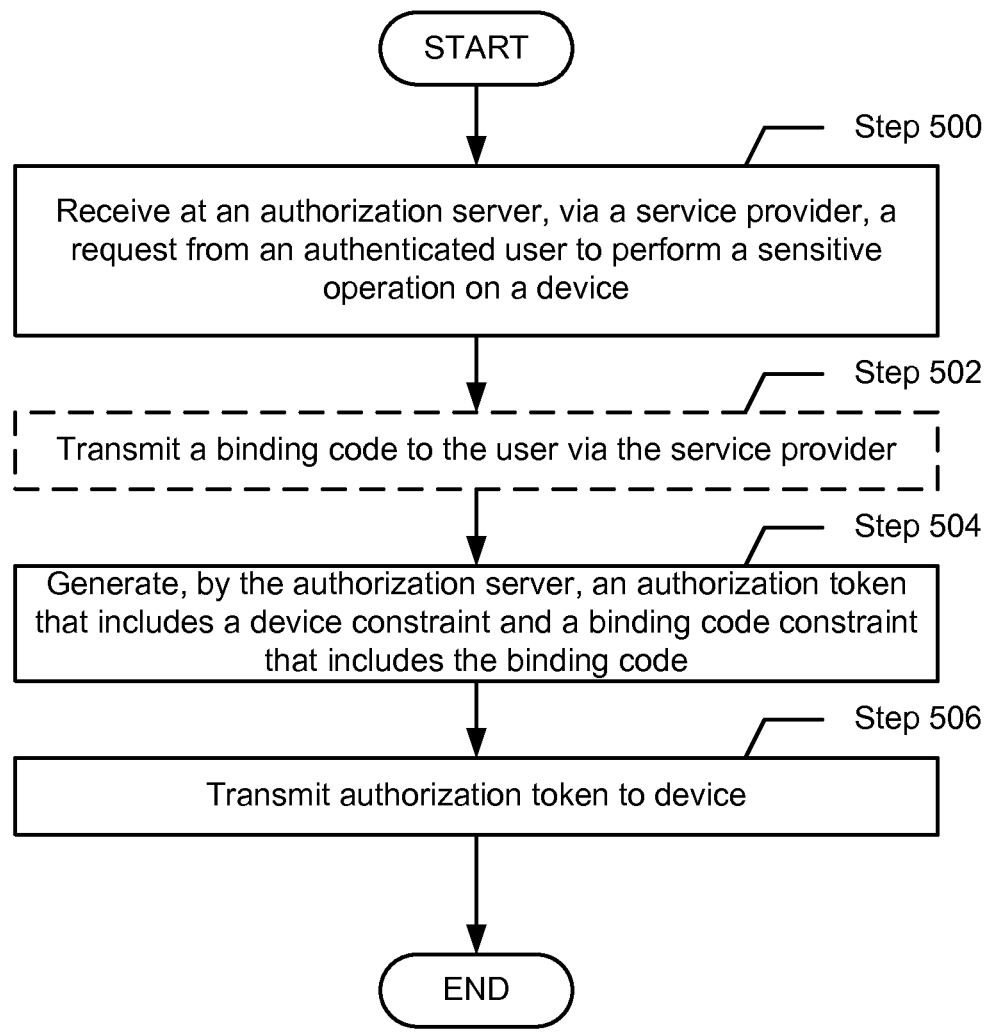
Figure 6:
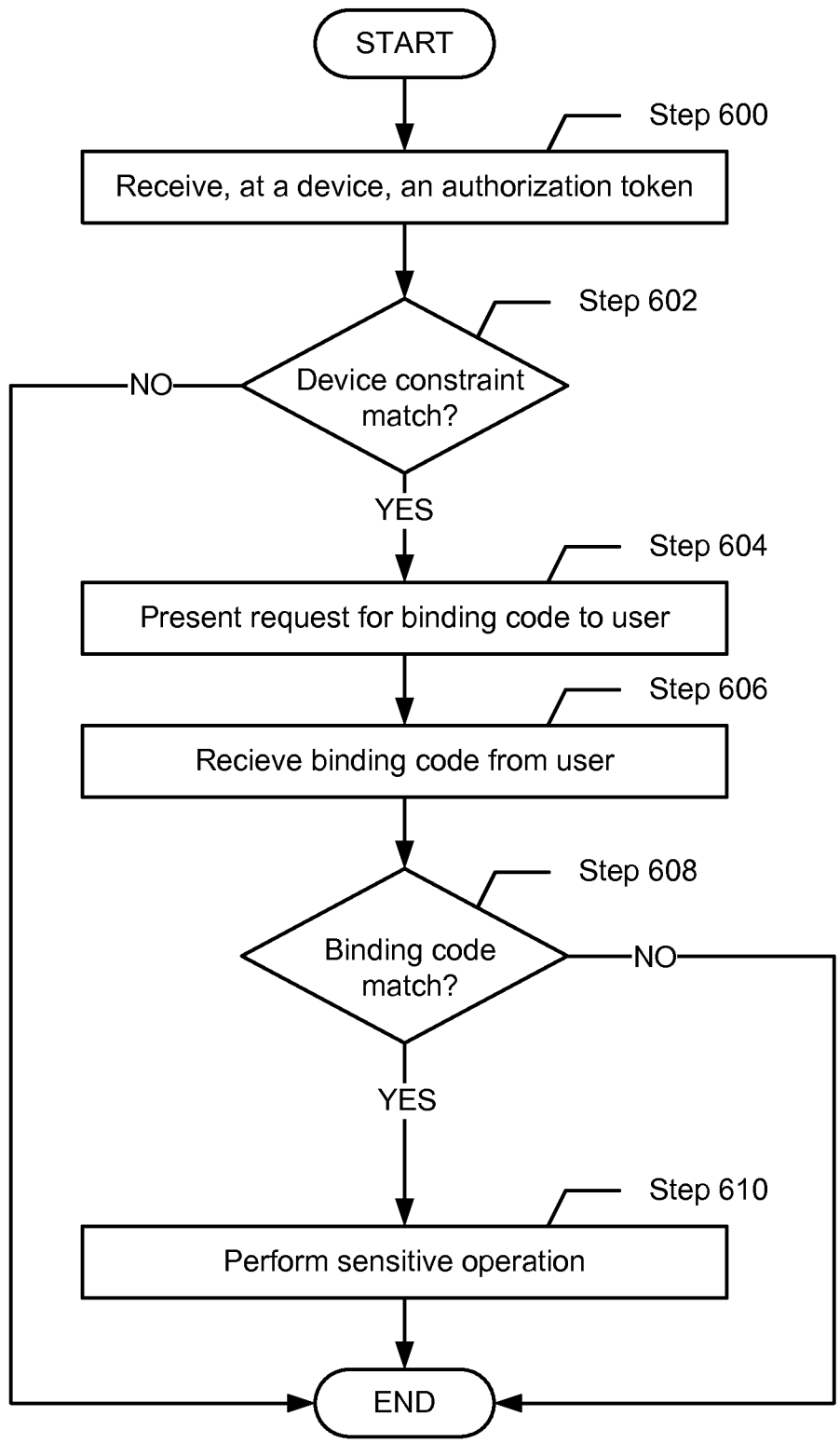

FIGS. 4-6 show flowcharts in accordance with one or more embodiments disclosed herein. While the various steps in these flowcharts are presented and described sequentially, one of ordinary skill in the art, having the benefit of this disclosure, will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments disclosed herein. By way of an example, determination steps may not require a processor to process an instruction unless an interrupt is received to signify that condition exists in accordance with one or more embodiments disclosed herein. As another example, determination steps may be performed by performing a test, such as checking a data value to test whether the value is consistent with the tested condition in accordance with one or more embodiments.

FIG. 4 shows a flowchart describing a method for providing a binding code to an authenticated user in accordance with one or more embodiments disclosed herein.

In Step 400, a request (i.e., an authorization request) is received at a device to perform a sensitive operation. In one or more embodiments disclosed herein, a sensitive operation is any instruction and/or series of instructions that may be performed on one or more devices and for which at least some level of authentication and/or authorization is required. Examples of sensitive operations include, but are not limited to, an operation related to security credentials, an operation related to financial information, a premium application content access operation, an operations related to a payment, a device management operation, an application installation operation, an application modification operation, an application removal operation, an application personalization, change of an application lifecycle state, and/or any combination thereof. In one or more embodiments disclosed herein, the authorization request is received from a user of a device via a service provider.

In one or more embodiments disclosed herein, the device at which a request to perform a sensitive operation is received is the same as the device on which the sensitive operation is to be performed. For example, the user may be a person attempting to install a new application on a device, and the new application installation may require sensitive operations. As another example, the user may be a person attempting to make a payment using a smart phone. In one or more embodiments disclosed herein, the request is received via in-person interaction with the device by a user. For example, the device may be operatively connected to a touch screen which a user uses to communicate the request to perform a sensitive operation to the device.

In other embodiments described herein, the request is received at a device that is separate from the device for which a sensitive operation is requested. For example, the device that receives the request may be a personal computer of a user that is seeking authorization to perform a sensitive operation on a separate tablet computer. In one or more embodiments disclosed herein, while the device for which a sensitive operation is requested includes a TEE, the device at which the user requests the sensitive operation may be a separate device that may or may not include a TEE.

In Step 402, the request is transmitted from the device towards a service provider. In one or more embodiments disclosed herein, the service provider is an entity that provides software, services and/or content that is related to the sensitive operation requested by the user. In one or more embodiments disclosed herein, a request may be transmitted via any mechanism available on the device and from which the service provider is configured to receive requests. As an example, an authorization request to perform a sensitive operation related to a payment may be transmitted from a network-connected device of a user to the service provider via a network.

In Step 404, a request for user authentication is received at a device from a service provider. In one or more embodiments disclosed herein, authentication of a user may occur via any authentication scheme used by a service provider. For example, the service provider may transmit to the device a request that the user enter a previously configured password that is associated with the user. As another example, service provider may transmit to the device a request that the user provide some form of biometric data (e.g., fingerprint scan, retina scan, voice recognition, etc.).

In Step 406, the request for user authentication that is received at the device from the service provider in Step 404 is presented to a user by the device. In one or more embodiments disclosed herein, the request for user authentication is presented to the user via any mechanism available to the device. For example, the device may output to a display screen a dialog box that asks the user to perform an action, such as typing in a password, providing biometric data, etc. As another example, the device may use sound (e.g., computer generated voice) to present the user authentication request to the user.

In Step 408, a user authentication response is transmitted from the device to the service provider. In one or more embodiments disclosed herein, the device receives the user authentication response from the user in response to the request for user authentication transmitted to the user in Step 406. In one or more embodiments disclosed herein, the device transmits the user authentication response to the service provider using any method available to the device. For example, the user authentication response may be encrypted and included in a payload by an application. In such an example, the payload may be transmitted to the service provider via a network.

In Step 410, a determination is made as to whether the user requesting to perform a sensitive operation is an authenticated user. In one or more embodiments disclosed herein, the service provider includes functionality to validate that the user authentication response includes valid information that allows the service provider to authenticate the user. In one or more embodiments disclosed herein, an authenticated user is a user that transmits, via a device, a user authentication response to the service provider that includes any user authentication related information that may be compared with an expected response (e.g., an expected value).

For example, if the authentication request received by the device in Step 404 and transmitted to the user in Step 406 included a request for a password, and the user authentication response transmitted to the service provider in Step 408 includes the character string "HammerTime451?", then the service provider will compare the string "HammerTime451?" with an expected password value stored as a character string in storage that is operatively connected to one or more computing devices of the service provider.

If the user is successfully authenticated by the service provider, the process proceeds to Step 412. However, if the user authentication is unsuccessful, the process ends. Alternatively, although not shown in FIG. 4, if the user authentication is unsuccessful, the service provider may re-transmit to the device a request for user authentication and, thus, the process may return to Step 404.

In Step 412, a binding code is received at a device from a service provider. In one or more embodiments disclosed herein, the binding code is generated via a process executed by the service provider. For example, the service provider may generate a character string in response to a successful user authentication. In one or more embodiments disclosed herein, a binding code is obtained by the service provider from an authorization server of an authorization entity. A service provider's optional receipt of a binding code from an authorization server is discussed further in the description of FIG. 5, below. In one or more embodiments disclosed herein, the binding code is received by the device from the service provider via any mechanism available by which the service provider is capable of communicating with the device. For example, the binding code may be communicated via email, text-message, a secure communication channel with an application executing on the device, and/or any other method by which a service provider is configured to communicate information. A binding code may be provided to a user any amount of time before the requested sensitive operation is to be performed.

In Step 414, the binding code is presented by the device to the user. In one or more embodiments disclosed herein, the binding code is presented to the user via any mechanism available to the device. For example, the user may be notified that a message has been received, after which the user may use the device to check the notification. In such an example, the user may respond to the notification by accessing the message, at which point the binding code may be presented to the user via display on a display device that is operatively connected to the device from which the user requested to perform a sensitive operation.

In one or more embodiments disclosed herein, the binding code is presented by the device to the user shortly after the binding code is received at the device. In other embodiments the binding code may be stored for any amount of time in a storage medium available to the device before it is transmitted to the user. In one or more embodiments disclosed herein, a binding code presented to a user has a time limit (e.g., ten minutes) after which the binding code is no longer valid. In one or more embodiments disclosed herein, the service provider may transmit a request to the authorization server to generate and send an authorization token to a device concurrently with presenting the binding code to the user.

FIG. 5 shows a flowchart describing a method for providing an authorization token to the device of a user in accordance with one or more embodiments disclosed herein.

In Step 500, an authorization request is received by an authorization server from an authenticated user via a service provider. In one or more embodiments disclosed herein, the authorization request is a request to perform a sensitive operation on a device. In one or more embodiments disclosed herein, once a user has been authenticated by a service provider (as discussed above in the description of FIG. 4), the service provider may transmit the authorization request to the authorization server. In one or more embodiments, the service provider has a pre-existing trusted relationship with an authorizing entity that operates the authorization server, which allows the authorization server to trust that authorization requests received from the service provider are for properly authenticated users for which authorization is required. In one or more embodiments disclosed herein, the authorization request may be received via any communication channel that exists between the service provider and the authorization entity and/or authorization server. For example, the authorization request may be communicated to the authorization server via a network. As another example, an employee of the service provider may contact an employee of the authorization entity to communicate the authorization request.

Optionally, in Step 502, a binding code is transmitted from the authorization server to the service provider from which the authorization request was received. In one or more embodiments disclosed herein, the binding code is transmitted first to the service provider from which the authorization request was received. In such embodiments, the service provider then, in turn, transmits the binding code to the device from which the authenticated user sent the authorization request. The device may then present the binding code to the authenticated user, as discussed in the description of FIG. 4, above. Alternatively, in one or more embodiments disclosed herein, the binding code is generated by the service provider. In such embodiments, in Step 502, rather than transmitting a binding code, the authorization server may transmit to the service provider an acknowledgement that a request to generate an authorization token has been received.

In Step 504, the authorization server generates an authorization token that includes, at least, a device constraint and a binding code constraint. In one or more embodiments disclosed herein, the authorization token is generated via any method available to the authorization server for generating data structures that are to be transmitted to remote (i.e., physically separate) devices. For example, the authorization server may include a software module configured to obtain the binding code that was previously transmitted to the user, as well as information associated with the device on which the user seeks to perform the sensitive operation. In such an example, the module includes functionality (e.g., via processor-executed instructions) to add the obtained binding code to the authorization token as a binding code constraint and to add at least a portion of the device information to the authorization token as one or more device constraints. In one or more embodiments disclosed herein, the inclusion of the device constraint(s) and the binding code constraint in the same authorization token pairs the user to whom the binding code was transmitted to with the device to which the one or more device constraints correspond.

In Step 506, the authorization token generated in Step 504 is transmitted to the device on which the user seeks to perform a sensitive operation. In one or more embodiments disclosed herein, the authorization token may the transmitted to the device via any means available to the authorization server. For example, the authorization server may be operatively connected to the device via a secure network channel through which the authorization server is configured to transmit the authorization token. In one or more embodiments disclosed herein, the authentication token is transmitted to a TEE of a device. For example, the sensitive operation requested by the user may be an operation that is to be performed via a trusted application executing within a TEE of a device. In such an example, the authorization token may be transmitted to the TEE of the device such that the authorization token is made available to the trusted application.

FIG. 6 shows a flowchart describing a method for authorizing a user to perform a sensitive operation on a device in accordance with one or more embodiments disclosed herein.

In Step 600, an authorization token is received at a device. In one or more embodiments disclosed herein, the authorization token is received from an authorization server. The authorization token may be received at TEE of the device. In one or more embodiments disclosed herein, the authorization token is stored, at least temporarily, within the trusted execution environment. For example, a trusted application executing within a TEE may include functionality to obtain an authorization token received at a device and perform an appropriate sequence of instructions by which the received authorization token is written to a storage medium operatively connected to and/or included in the device and available as a part of the TEE of the device.

In Step 602, a determination is made as to whether one or more device constraints included in the authorization token match one or more device constraints associated with the device at which the authorization token was received in Step 600. In one or more embodiments disclosed herein, the determination is made by comparing the values of the one or more device constraints with expected values known to the device and/or a TEE executing thereon. For example, if the authorization token includes a device identifier as a device constraint, the device may perform a comparison (e.g., using comparators, software, etc.) between the device identifier of the authorization token and a device identifier known to and associated with the device.

In one or more embodiments disclosed herein, matching one or more device constraints of the authorization token with expected values associated with the device ensures that the device receiving the authorization token is the correct device for which the authenticated user seeks to perform a sensitive operation. In one or more embodiments disclosed herein, if the device determines that the one or more device constraints of the authorization token match the expected device constraint known to the device, the process proceeds to Step 604. Otherwise, if the device constraints of the authorization token do not match, the authorization token will not provide authorization for a user to perform the sensitive operation and the process ends.

In Step 604, a request for the binding code that was previously transmitted to the authenticated user is presented to the user. In one or more embodiments disclosed herein, the request for the binding code is presented to the user via any mechanism available to the device at which the authentication token is received. For example, the receipt at the device of the authentication token may prompt a trusted application executing within the TEE of the device to open a trusted UI session prompting the user to enter the previously received binding code. In one or more embodiments disclosed herein, the request for the binding code is presented to the user from the same device from which the user originally requested to perform the sensitive operation, which is also the device on which the sensitive operation is to be performed. In other embodiments disclosed herein, the request for the binding code is presented on the device on which the user is seeking to perform the sensitive operation, which is separate from the device from which the user originally sent the request to perform the sensitive operation.

In Step 606, in one or more embodiments disclosed herein, the binding code is received at the device from the user. In one or more embodiments disclosed herein, the request is received from the user via any method available on the device through which a user may input information of any kind. For example, the binding code may be received via a keyboard which the user interacts with in order to enter a character string. As another example, the user may, using a cursor control device, browse to a certain file that includes the binding code and provide the location of the binding code (e.g., within a trusted storage location within a TEE) to a trusted UI session requesting the binding code. In one or more embodiments disclosed herein, the binding code is received from the user via a trusted UI. In other embodiments, the binding code is provided by the user via any other separate channel and/or command.

In Step 608, a determination is made as to whether the binding code received from the user in Step 606 can be verified using the binding code of the binding code constraint in the authorization token received at the device in Step 600. In one or more embodiments disclosed herein, the determination is made by comparing the value of the binding code included in the binding code constraint of the authorization token with binding code received from the user in Step 606. In one or more embodiments disclosed herein in which the binding code (e.g., binding code character string, digest of the binding code, signature of the binding code, etc.) of the binding code constraint is encrypted, the determination is made using one or more cryptographic calculations. In one or more embodiments disclosed herein, matching the binding code of the authorization token with binding code provided by the user ensures that the user of the device is the authenticated user that requested to perform the sensitive operation on the device (e.g., as initially requested in Step 400 of FIG. 4). In one or more embodiments disclosed herein, if the device determines that the binding code of the authorization token match binding code received from the user, the process proceeds to Step 610. Otherwise, if the binding code of the authorization token does not match the binding code provided by the user, the authorization token will not provide authorization for a user to perform the sensitive operation and the process ends. Alternatively, although not shown in FIG. 6, if the binding code match is unsuccessful (e.g., due to a typographical error of the user entering the binding code), the device may re-transmit to the user a request for the binding code and, thus, the process may return to Step 604.

In Step 610, the sensitive operation is performed. In one or more embodiments disclosed herein, the sensitive operation is performed within the TEE of the device. For example, the sensitive operation may be a series of instructions to be executed on a processor of the device by a trusted application executing within the TEE of the device. For another example, the sensitive operation may be installation of an application that includes a trusted application portion to be installed in the TEE. In one or more embodiments disclosed herein, the sensitive operation is only performed after the one or more device constraints and the binding code in the authorization token have been verified. In such embodiments, the verification of both the device constraints and the binding code may ensure that the sensitive operation: (i) may only be performed on the device for which the user requested the sensitive operation; and (ii) may only be performed by the authenticated user to whom the binding code was sent. Therefore, in one or more embodiments disclosed herein, the device, via the device constraints, is bound to the authenticated user in regards to whether a sensitive operation is authorized.

Figure 7:
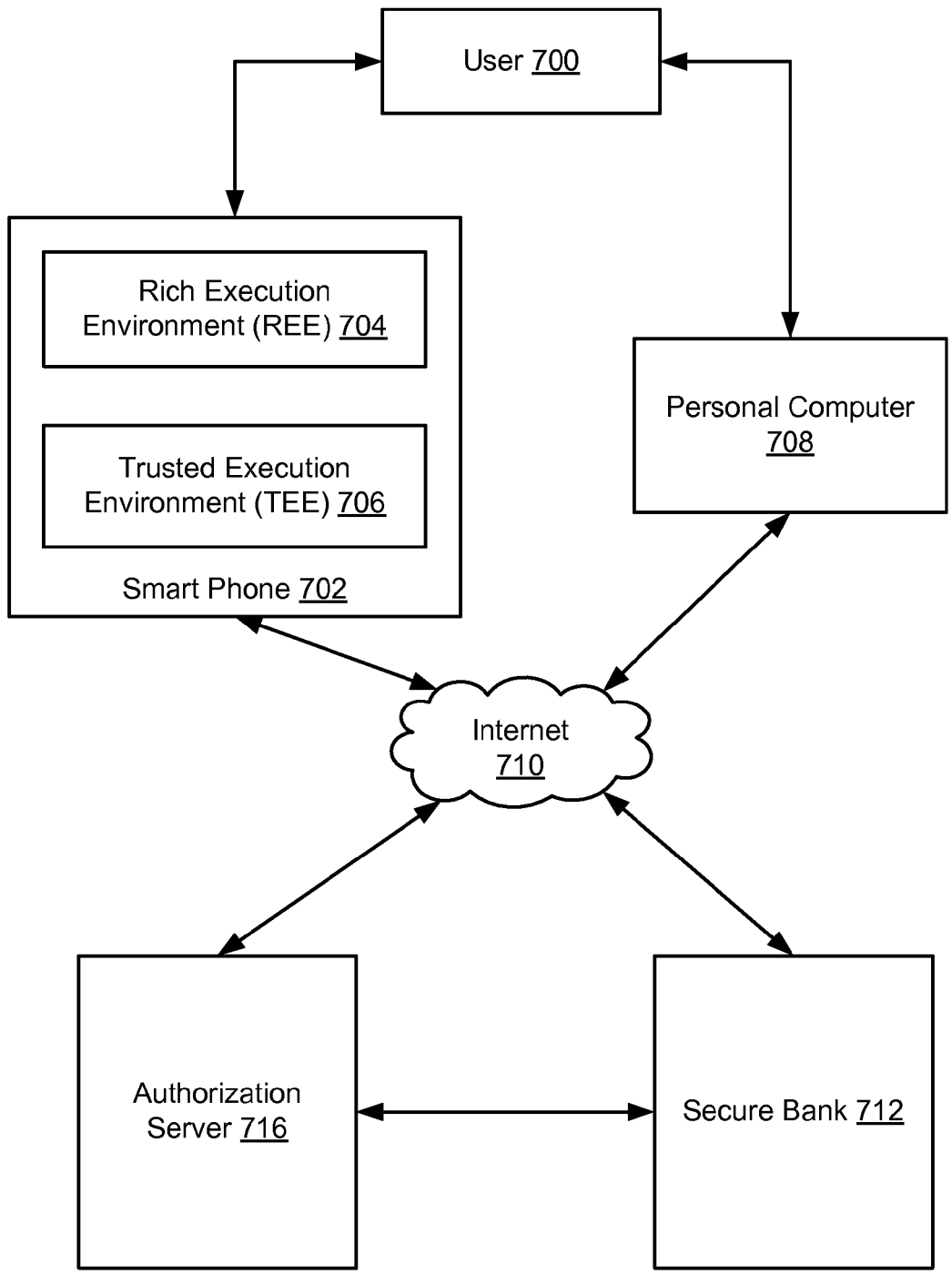
FIG. 7 shows an example in accordance with one or more embodiments disclosed herein.

FIG. 7 shows an example in accordance with one or more embodiments disclosed herein. The following example is for explanatory purposes only and not intended to limit the scope of the embodiments disclosed herein.

Referring to FIG. 7, consider a scenario in which a user (700) owns both a smart phone (702) and a personal computer (708). The smart phone includes both a REE (704) and a TEE (706). Both the smart phone and the personal computer are connected to the Internet (710). The scenario also includes Secure Bank (712), which is a service provider that provides financial services and mobile device applications for use by customers. In the instant scenario, the user (700) is a customer of Secure Bank (712). Secure Bank is also connected to the Internet (710). The scenario additionally includes an authorization server (716) that is connected to the Internet and is operated by an authorization entity (not shown) that has a pre-existing trusted relationship with the Secure Bank (712).

In such a scenario, the user (700) seeks to register the user's smart phone (702) as a trusted device for performing online banking transactions with Secure Bank. Such a registration operation is a sensitive operation that requires a number of instructions to be executed by a trusted application (not shown) executing within the TEE (706) of the smart phone (702). To that end, the user (700) sends uses a personal computer (708) to send a request to register the smart phone, which goes to Secure Bank (712). Secure Bank, in response, transmits a user authentication request to the personal computer of the user. The user authentication request is a request for the user to provide a retina scan. Once the device receives the retina scan request from the service provider, the smart phone (702) transmits the request to the user (700) via a dialog box that opens on a monitor operatively connected to the personal computer (708) and visible to the user.

The user (700), in response to the prompt, uses hardware and software executing on and/or attached to the personal computer (708) to scan the user's retina. The personal computer (708) then sends, via an application using the network stack of the personal computer, the retina scan to Secure Bank (712). Secure Bank then verifies the retina scan by comparing the received retina scan with retina scan information that Secure Bank already has that is associated with the user (700).

The retina scan provided by the user (700) is determined by Secure Bank (712) to match the retina scan on file, therefore the Secure Bank generates a binding code for the now-authenticated user. The binding code is a character string. Secure Bank then transmits the binding code to the user via the personal computer while concurrently transmitting the binding code to the authorization server (716) along with the authorization request to generate an authorization token to send to the smart phone (702).

Once the authorization server (716) receives the request from Secure Bank (712), the authorization server then generates the authorization token (not shown). The authorization token includes a binding code constraint that includes the binding code, which may be encrypted, that was received from Secure Bank and which was provided to the authenticated user by Secure Bank. The authorization token additionally includes, as a device constraint, a device identifier. The device identifier is data that identifies a device and which the authorization server knows to be associated with the smart phone.

After the authorization token is generated, the authorization token is transmitted, by the authorization server (716) via the Internet (710), to a trusted application executing in the TEE (706) of the smart phone as a part of a larger Secure Bank application that includes portions in both the TEE (706) and the REE (704) of the smart phone. The authorization token is encrypted before being sent, and therefore includes a digital signature which may be used to decrypt the authorization token.

Once the authorization token is received by the trusted application executing in the TEE of the smart phone (702), and the authorization token an binding code have been decrypted via a cryptographic operation, the device identifier included as a device constraint in the authorization token is compared by the smart phone with a device identifier associated with the smart phone to determine that the device identifiers match. Next, a trusted UI session is opened on the smart phone that prompts the user (700) to enter the binding code previously received from Secure Bank (712). Once the user enters the binding code, a comparison is performed that determines that the binding code included in the binding code constraint of the authorization token matches the binding code provided by the user via the trusted UI. Therefore, both the device and the user have been verified, and thus the sensitive operation (i.e., registration of the smart phone to perform sensitive banking operations) requested by the user is authorized to proceed. Therefore, the user uses the smart phone to initiate a funds transfer from the user's bank account at Secure Bank.

Figure 8:
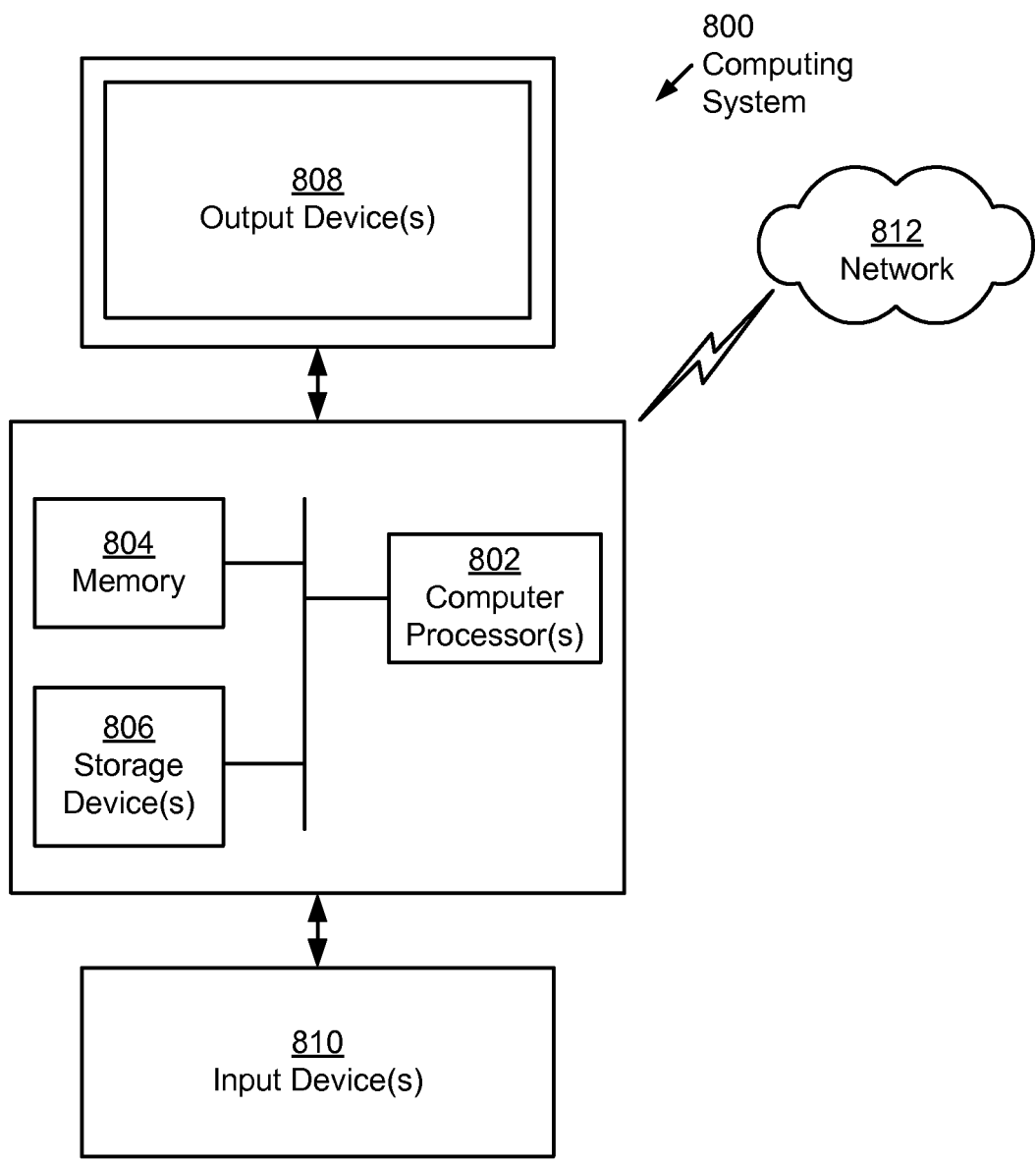
FIG. 8 shows a computing system in accordance with one or more embodiments disclosed herein.

Embodiments disclosed herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be connected locally and/or remotely (e.g., via the network (812)) connected to the computer processor(s) (502), memory (504), and storage device(s) (806). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments disclosed herein.

Further, one or more elements of the aforementioned computing system (800) may be located at a remote location and connected to the other elements over a network (812). Further, embodiments may be implemented on a distributed system having a plurality of nodes, where each portion of an embodiment may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the embodiments have been described with respect to a limited number of embodiments, those skilled in the art, having benefit of this disclosure, will appreciate that other embodiments can be devised which do not depart from the scope of the embodiments as disclosed herein. Accordingly, the scope of embodiments disclosed herein should be limited only by the attached claims.

What is claimed is:

1. A method comprising:
receiving from an authenticated user, at an authorization server, via a service provider, an authorization request to perform a sensitive operation on a first device;
generating, by the authorization server and in response to receiving the authorization request, an authorization token comprising a device constraint and a binding code constraint comprising a binding code, wherein the binding code is provided to the authenticated user by the service provider after the authenticated user makes the authorization request and before the authorization token is sent to the first device;
transmitting, by the authorization server, the authorization token to an isolated execution environment of the first device, wherein the sensitive operation is not permitted on the first device unless the first device successfully performs a verification in the isolated execution environment using the authorization token, wherein performing the verification by the first device comprises:
performing a first comparison in the isolated execution environment using the device constraint of the authorization token to determine that the device constraint matches an expected value;
after successfully performing the first comparison, presenting, to the authenticated user, a request for the binding code;
receiving, from the authenticated user and in response to the request, the binding code; and performing a second comparison using the binding code constraint of the authorization token to determine that the binding code of the binding code constraint matches a received binding code provided by the authenticated user on the first device; and permitting the sensitive operation based on the verification.

2. The method of claim 1, wherein the received binding code is provided by the authenticated user on the first device via a trusted user interface (UI).

3. The method of claim 1, wherein the expected value is a device identifier of the first device.

4. The method of claim 1, wherein the authorization request is sent by the authenticated user from a second device to the authorization server via the service provider.

5. The method of claim 1, further comprising:

generating, by the authorization server and in response to receiving the authorization request, the binding code; and transmitting the binding code to the service provider, wherein the service provider transmits the binding code to the authenticated user.

6. The method of claim 1, wherein, before becoming the authenticated user, a user is authenticated by the service provider.

7. The method of claim 1, further comprising, before transmitting the authorization token, encrypting the binding code of the binding code constraint of the authorization token, wherein the authorization token further includes at least one selected from a group consisting of a retry counter and an expiration date.

8. The method of claim 1, wherein the authorization server is operated by an authorization entity in a trusted relationship with the service provider.

9. The method of claim 1, wherein the sensitive operation is one selected from a group consisting of an application installation, an application modification, and an application removal.

10. The method of claim 1, wherein the binding code is generated by the service provider before the binding code is transmitted to the authenticated user by the service provider.

11. A system comprising:

an authorization server comprising a first processor and first memory and configured to:

receive from an authenticated user, via a service provider, an authorization request to perform a sensitive operation on a first device;

generate, in response to receiving the authorization request, an authorization token comprising a device constraint and a binding code constraint comprising a binding code, wherein the binding code is provided to the authenticated user by the service provider after the authenticated user makes the authorization request and before the authorization token is sent to the first device; and transmit the authorization token to an isolated execution environment of the first device, wherein the sensitive operation is not authorized on the first device unless the first device successfully performs a verification in the isolated execution environment using the authorization token, wherein the verification comprises a first comparison and a second comparison; and the first device comprising a second processor, second memory and the isolated execution environment and configured to:

perform, in the isolated execution environment, the first comparison using the device constraint of the authorization token to determine that the device constraint matches an expected value;

after successfully performing the first comparison, present, to the authenticated user, a request for the binding code;

receive, from the authenticated user and in response to the request, the binding code;

perform, in the isolated execution environment, the second comparison using the binding code constraint of the authorization token to determine that the binding code of the binding code constraint matches a received binding code provided on the first device by the authenticated user, wherein successful performance of the first verification and the second verification authorizes performance of the sensitive operation; and perform the sensitive operation on the first device based on the verification.

12. The system of claim 11, wherein the authorization request is sent by the authenticated user from a second device to the authorization server via the service provider.

13. The system of claim 11, wherein the authorization server is further configured to:

generate, by the authorization server and in response to receiving the authorization request, the binding code; and transmit the binding code to the service provider, wherein the service provider transmits the binding code to the authenticated user.

14. The system of claim 11, wherein the binding code is provided on the first device by the authenticated user via one selected from a group consisting of a trusted user interface (UI) and a separate channel.

15. The system of claim 11, wherein, before becoming the authenticated user, a user is authenticated by the service provider.

16. The system of claim 11, wherein the expected value comprises one selected from a group consisting of a device identifier and a trusted execution environment (TEE) identifier.

17. The system of claim 11, wherein the authorization server is further configured to, before transmitting the authorization token, encrypt the binding code of the binding code constraint of the authorization token and wherein the first device is further configured to perform a cryptographic calculation before performing the first verification.

18. The system of claim 11, wherein the authorization server is operated by an authorization entity in a trusted relationship with the service provider.

19. The system of claim 11, wherein the sensitive operation is one selected from a group consisting of a banking operation, a premium content access operation, a payment operation, and a device management operation.

20. A non-transitory computer readable medium comprising instructions that, when executed by a computer processor, perform a method comprising:

receiving from an authenticated user, at an authorization server, via a service provider, an authorization request to perform a sensitive operation on a first device;

generating, by the authorization server and in response to receiving the authorization request, an authorization token comprising a device constraint and a binding code constraint comprising a binding code, wherein the binding code is provided to the authenticated user by the service provider after the authenticated user makes the authorization request and before the authorization token is sent to the first device;

transmitting, by the authorization server, the authorization token to an isolated execution environment of the first device, wherein the sensitive operation is not permitted on the first device unless the first device successfully performs a verification in the isolated execution environment using the authorization token, wherein performing the verification by the first device comprises:

performing a first comparison in the isolated execution environment using the device constraint of the authorization token to determine that the device constraint matches an expected value;

after successfully performing the first comparison, presenting, to the authenticated user, a request for the binding code;

receiving, from the authenticated user and in response to the request, the binding code; and performing a second comparison using the binding code constraint of the authorization token to determine that the binding code of the binding code constraint matches a received binding code provided by the authenticated user on the first device; and permitting the sensitive operation based on the verification.

21. The non-transitory computer readable medium of claim 20, wherein the binding code is provided by the authenticated user to via a trusted user interface (UI).

22. The non-transitory computer readable medium of claim 20, wherein the expected value is a trusted execution environment (TEE) identifier.

23. The non-transitory computer readable medium of claim 20, wherein the authorization request is sent by the authenticated user from a second device to the authorization server via the service provider.

24. The non-transitory computer readable medium of claim 20, wherein the authorization token is sent to a trusted execution environment (TEE) of the first device.

25. The non-transitory computer readable medium of claim 20, wherein, before becoming the authenticated user, a user is authenticated by the service provider.

26. The non-transitory computer readable medium of claim 20, further comprising, before transmitting the authorization token, encrypting the binding code of the binding code constraint of the authorization token, and wherein the authorization token further includes at least one selected from a group consisting of a retry counter and an expiration date.

27. The non-transitory computer readable medium of claim 20, wherein the authorization server is operated by an authorization entity in a trusted relationship with the service provider.

28. The non-transitory computer readable medium of claim 20, wherein the sensitive operation is one selected from a banking operation, a premium content access operation, a payment operation, and a device management operation.

29. The non-transitory computer readable medium of claim 20, wherein the binding code is generated by the service provider before the binding code is transmitted to the authenticated user by the service provider.

* * * * *

UNITED STATES PATENT AND TRADEMARK OFFICE
CERTIFICATE OF CORRECTION

PATENT NO. : 9,569,602 B2
APPLICATION NO. : 14/615274
DATED : February 14, 2017
INVENTOR(S) : Violleau et al.

Page 1 of 1

It is certified that error appears in the above-identified patent and that said Letters Patent is hereby corrected as shown below:

On the Title Page

On page 2, Column 1, under Other Publications, Line 3, delete "Mathematices" and insert -- Mathematics --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*